UNITED STATES PATENT OFFICE.

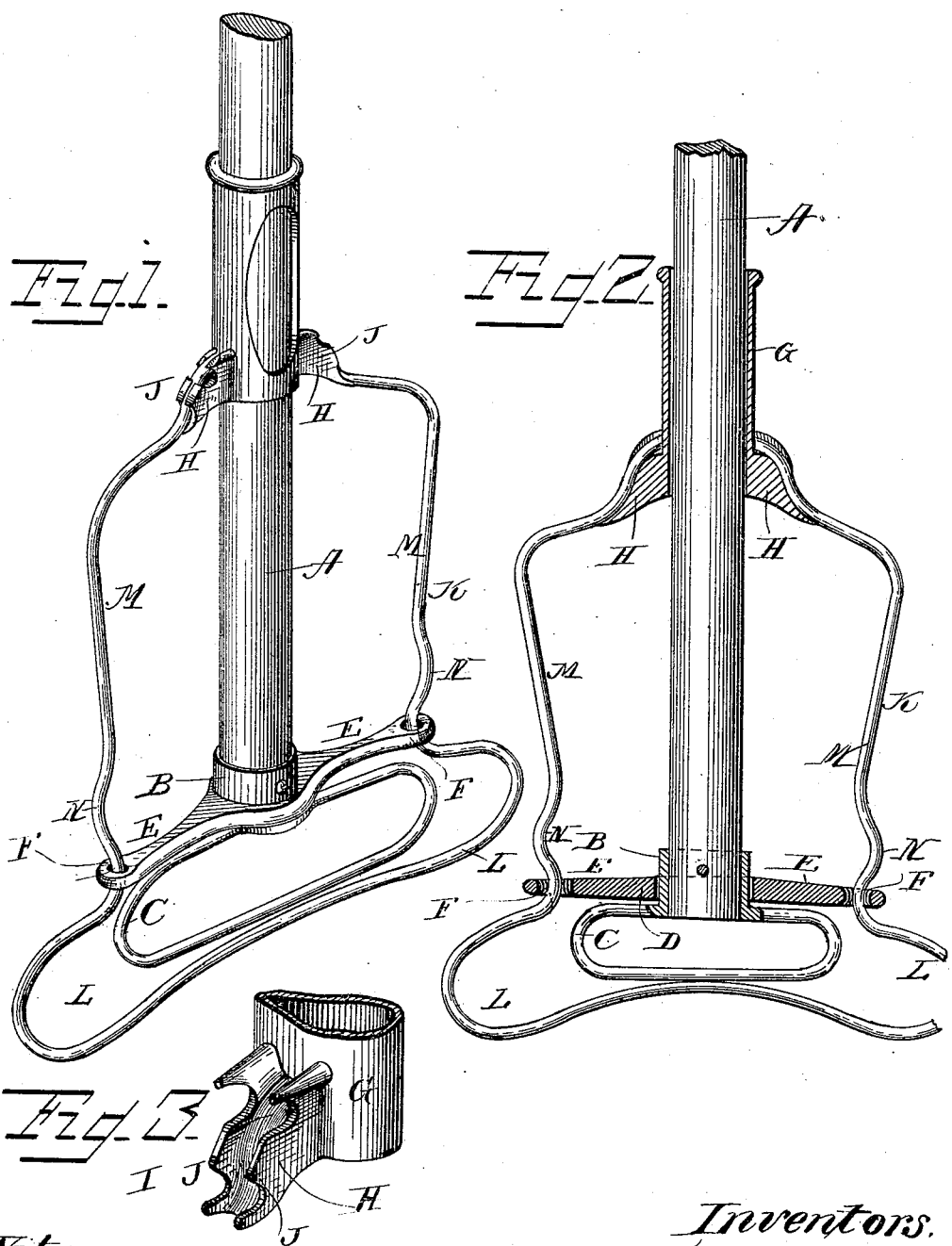

FRANK W. BURNS AND WESLEY MALICK, OF ERIE, PENNSYLVANIA, ASSIGNORS TO SAID BURNS.

MOP-HOLDER.

SPECIFICATION forming part of Letters Patent No. 270,930, dated January 23, 1883.

Application filed August 28, 1882. (No model.)

*To all whom it may concern:*

Be it known that we, FRANK W. BURNS and WESLEY MALICK, of Erie, in the county of Erie and State of Pennsylvania, have invented certain new and useful Improvements in Mop-Holders; and we do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a longitudinal sectional view; and Fig. 3 is a detail view of one of the lugs for attaching the wire bail to the sleeve.

Corresponding parts in the several figures are denoted by like letters of reference.

This invention relates to mop-holders; and it consists in certain improvements in the construction of the same, which will be hereinafter fully described, and particularly pointed out in the claim.

In the drawings hereto annexed, A represents the handle of our improved mop holder, which is provided at its lower end with a ferrule, B, having a suitably-constructed oblong loop, C.

D is a bar swiveled so as to revolve freely upon the ferrule B, and provided with outward-projecting arms, E E, having eyes or perforations F at their outer ends.

G is a sleeve sliding freely upon the handle A, and provided at its lower or outer end with lugs, H H, located on diametrically-opposite sides of said sleeve. The sleeve G, with the lugs H, is by preference cast in a single piece of malleable iron or other suitable material. The outer sides or faces of the lugs H are curved or elongated S-shaped, and provided with grooves I and side flaps, J, formed at suitable intervals.

K is a bail, made of strong wire, which should be somewhat elastic in its nature. The outer or lower end of said bail is made wider than the rest, so as to form a loop, L. The arms M of the bail are passed through the eyes F in the arms E of bar D, and their ends are bent, as shown, and fastened in the grooves I of the lugs H, where they are firmly secured by swaging or clinching the flaps J. In this manner the bail is secured to the sleeve without drilling holes for its reception, and we thus save much time in the manufacture, and consequently reduce the cost of production of our improved mop-holder. The sides or arms of the bail K are provided just above the loop L with U-shaped bends N. When in operation the handle is slid down into the bail, the eyes F of arms E slide over said bends, which form spring-latches that serve to retain the handle and bail in proper position in relation to each other for operation.

We are aware of the patent to Omo, No. 263,058, August 22, 1882, and we claim nothing therein shown.

We claim and desire to secure by Letters Patent of the United States—

In a mop-holder, the combination, with the handle having ferrule B, provided with loop C and swiveled bar D, the ends of which, E, have perforations F, of the sleeve G, having bail K, the arms of which are provided with U-shaped bends N, as and for the purpose set forth.

In testimony that we claim the foregoing as our own we have hereto affixed our signatures in presence of two witnesses.

FRANK WILLIAM BURNS.
WESLEY MALICK.

Witnesses:
H. A. STRONG,
GEO. A. ALLEN.